United States Patent
Li et al.

(10) Patent No.: US 10,698,152 B2
(45) Date of Patent: Jun. 30, 2020

(54) MANUFACTURING METHOD OF DISPLAY MODULE SUITABLE FOR FAST CURING OF GLUE AND EASY FOR REWORK

(71) Applicant: HUIZHOU CHINA STAR OPTOELECTRONICS TECHNOLOGY CO.,LTD., Huizhou Guangdong (CN)

(72) Inventors: Dehua Li, Guangdong (CN); Gang Yu, Guangdong (CN)

(73) Assignee: HUIZHOU CHINA STAR OPTOELECTRONICS TECHNOLOGY CO., LTD., Huizhou, Guangdong (CN)

( * ) Notice: Subject to any disclaimer, the term of this patent is extended or adjusted under 35 U.S.C. 154(b) by 29 days.

(21) Appl. No.: 16/001,392

(22) Filed: Jun. 6, 2018

(65) Prior Publication Data

US 2019/0235151 A1 Aug. 1, 2019

Related U.S. Application Data

(63) Continuation of application No. PCT/CN2018/077263, filed on Feb. 26, 2018.

(30) Foreign Application Priority Data

Jan. 26, 2018 (CN) .......................... 2018 1 0081680

(51) Int. Cl.
*F21V 8/00* (2006.01)

(52) U.S. Cl.
CPC ........... *G02B 6/0065* (2013.01); *G02B 6/009* (2013.01); *G02B 6/0055* (2013.01); *G02B 6/0085* (2013.01); *G02B 6/0088* (2013.01)

(58) Field of Classification Search
CPC combination set(s) only.
See application file for complete search history.

(56) References Cited

U.S. PATENT DOCUMENTS

2011/0069251 A1 3/2011 Hung
2011/0261276 A1* 10/2011 Yu ........................ G02B 6/0028
349/16

(Continued)

FOREIGN PATENT DOCUMENTS

CN 202992921 U 6/2013
CN 204613548 U 9/2015

(Continued)

OTHER PUBLICATIONS

International search report dated Nov. 1, 2018 from corresponding application No. PCT/CN2018/077263.

(Continued)

*Primary Examiner* — Lauren Nguyen
(74) *Attorney, Agent, or Firm* — Leong C. Lei

(57) ABSTRACT

The invention provides a manufacturing method of display module, comprising: performing a first-time dispensing on backplate bottom; providing a two-color molding middle frame comprising three connected sidewalls connected forming accommodating space, each sidewall vertically extending into the accommodating space and having a protruding portion; the sidewalls being colored, the protruding portion comprising a colorless transparent portion; placing the middle frame and backlight assembly with reflective sheet and light-guiding plate on backplate with the colorless transparent portion placed on the first-time dispensing glue, and the colorless transparent portion facing the backlight assembly, and the backlight assembly in accommodating space; performing a second-time dispensing on upper surface of colorless transparent portion; placing a display panel on backlight assembly with display panel located on the (Continued)

second-time dispensing; irradiating UV light on incident surface of light-guiding plate, with the UV light transmitted to the first-time and second-time dispensing to cure glue at dispensing positions.

8 Claims, 7 Drawing Sheets

(56) References Cited

U.S. PATENT DOCUMENTS

| | | | |
|---|---|---|---|
| 2012/0267480 A1 | 10/2012 | Sybert | |
| 2013/0208510 A1* | 8/2013 | Takashima | G09F 13/04 |
| | | | 362/615 |
| 2014/0133174 A1* | 5/2014 | Franklin | H05K 9/0067 |
| | | | 362/606 |

FOREIGN PATENT DOCUMENTS

| | | |
|---|---|---|
| CN | 105278158 A | 1/2016 |
| CN | 205301760 U | 6/2016 |
| CN | 106526968 A | 3/2017 |
| CN | 106773274 A | 5/2017 |
| CN | 107403873 A | 11/2017 |
| CN | 107422538 A | 12/2017 |

OTHER PUBLICATIONS

Notice of Allowance dated Jan. 29, 2019 from corresponding application No. CN 201810081680.2.

\* cited by examiner

MANUFACTURING METHOD OF DISPLAY MODULE SUITABLE FOR FAST CURING OF GLUE AND EASY FOR REWORK

CROSS REFERENCE TO RELATED APPLICATIONS

This application is a continuing application of PCT Patent Application No. PCT/CN2018/077263, entitled "DISPLAY MODULE, MANUFACTURING METHOD THEREOF AND DISPLAY DEVICE", filed on Feb. 26, 2018, which claims priority to Chinese Patent Application No. CN201810081680.2, filed on Jan. 26, 2018, both of which are hereby incorporated in its entireties by reference.

BACKGROUND OF THE INVENTION

1. Field of the Invention

The present invention relates to the field of display and, in particular, to the field of a display module, manufacturing method thereof and display device.

2. The Related Arts

With the development of display technology, the appearance of common display devices, such as, televisions, gradually develops toward a narrow border or borderless, so that a structural glue is often used to fix the display panel on the backlight module. However, the viscous materials, such as, structural adhesives, used in the known display devices have a long curing time, and difficult for disassembling and reworking display devices, which greatly reduces the production efficiency.

SUMMARY OF THE INVENTION

The primary object of the present invention is to provide a display module and a display device, suitable for fast curing of the glue and easy for rework process.

Specifically, the first embodiment of the present invention provides a manufacturing method of display module, which comprises;

providing a backplate, performing a first-time dispensing on bottom of the backplate;

providing a two-color molding middle frame, the middle frame comprising three sidewalls connected in sequence to form an accommodating space, a bottom portion or a middle portion of each sidewall vertically extending into the accommodating space to form a protruding portion; the sidewalls being colored, and the protruding portion comprising a colorless transparent portion;

placing the middle frame and a backlight assembly on the backplate so that the colorless transparent portion of the protruding portion being placed on the first-time dispensing glue, and the colorless transparent portion facing the backlight assembly, and the backlight assembly being in the accommodating space; the backlight assembly comprising a reflective sheet, a light-guiding plate, and an optical film, all sequentially stacked on the backplate;

performing a second-time dispensing on upper surface of the colorless transparent portion of the protruding portion;

placing a display panel on the backlight assembly with the display panel located on the second-time dispensing;

using an ultraviolet (UV) curing light to irradiate incident surface of the light-guiding plate, with the ultraviolet light transmitted to the first-time dispensing and the second-time dispensing to cure glue at dispensing positions.

According to a preferred embodiment of the present invention, the protruding portion comprises a colored portion and a colorless transparent portion, the colored portion is connected to the sidewall; or the protruding portion is entirely colorless and transparent.

According to a preferred embodiment of the present invention, the three protruding portions extending from the three sidewalls of the middle frame are on the same plane, and the three protruding portions have the same height.

Optionally, the middle frame comprises a first sidewall, a second sidewall and a third sidewall sequentially connected, wherein the second sidewall is located between the first sidewall and the third sidewall, and the second sidewall is perpendicular to both the first sidewall and the third sidewall; the accommodating space of the middle frame is in the shape of Π.

According to a preferred embodiment of the present invention, the middle frame is monolithically made of a plastic material.

Specifically, the middle frame is disposed outside the backlight assembly and surrounds three sides of the backlight assembly; longitudinal cross-sections of the middle frame in a direction perpendicular to the sidewalls vertical section of the middle frame in the direction perpendicular to the sidewalls (comprising the first sidewall, the second sidewall and the third sidewall) are in a shape of "⊢", at this time, each of three protruding portions extends from the middle portion of each sidewall; that is, the longitudinal cross-section of the middle frame in a direction perpendicular to the first sidewall and perpendicular to the protrusion portion extending from the middle of the first sidewall is in a shape of "⊢", and the longitudinal cross-section of the middle frame in a direction perpendicular to the second sidewall and perpendicular to the protrusion portion extending from the middle of the second sidewall is in a shape of "⊢".

According to a preferred embodiment of the present invention, sum of the height of the protrusion portion and thickness of glue layer of the first-time dispensing is greater than or equal to total height of the backlight assembly.

According to a preferred embodiment of the present invention, the manufacturing method further comprises:

removing the UV curing light, placing a light bar on the incident surface of the light-guiding plate;

placing a batten the batten between the display panel and the light-guiding plate to be located outside the light bar;

placing a front frame outside the batten, with the display panel partially protruding into the front frame to complete preparation of the display module.

In the manufacturing method of display module provided by the first embodiment of the present invention, a two-color molding middle frame of a specific structure is used for first-time dispensing the colorless transparent portion of the protruding portion corresponding to the backplate, and second-time dispensing on the upper surface of the display panel corresponding to the colorless transparent portion, irradiating the end surface of the light-guiding plate with UV light can transmit the UV light to the above two dispensing positions and cure the glue into a photosensitive glue layer. Compared with the prior art using structural adhesive to bond the display panel and the backlight module, the present method can greatly shorten the glue curing time to greatly improves assembly efficiency. Moreover, when the display module needs to be reworked, the light able to disintegrate the photo-sensitive glue layer can be radiated on the light-guiding plate, so that the components of the display module can be easily and effectively separated for maintenance.

A second embodiment of the present invention provides a display module, which comprises: a backlight module, and a display panel disposed on the backlight module; the backlight module comprising a backplate and a backlight assembly disposed on the backplate, the backlight assembly comprising a reflective sheet, a light-guiding plate, and an optical film, all sequentially stacked on the backplate;

the backlight module further comprising a two-color molding middle frame, the middle frame comprising three sidewalls connected in sequence to form an accommodating space, a bottom portion or a middle portion of each sidewall vertically extending into the accommodating space and having a protruding portion; the sidewalls being colored, and the protruding portion comprising a colorless transparent portion; wherein the protruding portion of the middle frame and the backlight assembly being on the backplate, the backlight assembly being in the accommodating space, the colorless transparent portion facing the backlight assembly; wherein a photo-sensitive glue layer being disposed between the backplate and the colorless transparent portion, and between the display panel and the colorless transparent portion.

The display module provided by the second embodiment of the present invention is manufactured by the method of the first embodiment of the present invention. In the display module, the side of the two-color molding middle frame faces the light-exiting end surface of the light-guiding plate, and the photo-sensitive glue layer is only disposed on the upper and lower surfaces of the colorless transparent portion of the middle frame. Therefore, the glue layer takes short time to cure. When the display module requires reworking, the light able to disintegrate and strip off the photo-sensitive glue layer can be radiated on the light-guiding plate without destroying the display panel and the backlight assembly, so that the components of the display module can be easily and effectively separated for maintenance.

The present invention also provides a display device, and the display device comprises the display module of the second embodiment of the present invention.

The following will describe the advantages of the present invention in details.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort.

FIG. 1b is an enlarged view of the A area in FIG. 1a.

FIG. 2b is an enlarged view of the B area in FIG. 2a.

FIG. 4b is an enlarged view of the C area in FIG. 4a.

FIG. 4c is a cross-sectional view along A-A in FIG. 4a.

FIG. 5b is an enlarged view of the D area in FIG. 5a.

FIG. 7b is a cross-sectional view along B-B in FIG. 7a.

DETAILED DESCRIPTION OF THE PREFERRED EMBODIMENTS

To further explain the technical means and effect of the present invention, the following refers to embodiments and drawings for detailed description. Apparently, the described embodiments are merely some embodiments of the present invention, instead of all embodiments. All other embodiments based on embodiments in the present invention and obtained by those skilled in the art without departing from the creative work of the present invention are within the scope of the present invention.

The terms "comprising" and "having" and any variations thereof appearing in the specification, claims, and drawings of the present application are intended to cover non-exclusive inclusion. For example, a process, method, system, product, or device that includes a series of steps or units is not limited to the listed steps or units, but optionally also includes steps or units not listed, or alternatively, other steps or units inherent to these processes, methods, products or equipment. In addition, the terms "first", "second" and "third" are used to distinguish different objects and not intended to describe a particular order.

In addition, the following description of various embodiments is provided with reference to additional drawings to exemplify specific embodiments that the invention may be used to implement. Directional terms mentioned in this specification, for example, "top", "bottom", "upper", "lower", "front", "back", "left", "right", "inside", "outside", and "side", and the like, are only for reference to the direction of the appended drawings. Therefore, the directional terms are used to better and more clearly illustrate and understand the present invention, and do not indicate or imply that the indicated device or element must have the particular orientation, construction and operation in a particular orientation, and is not to be construed as limiting the present invention.

The present invention provides a manufacturing method of display module. The display module comprises: a backlight module, and a display panel disposed on the backlight module; the backlight module comprises a backplate and a backlight assembly disposed on the backplate. The backplate supports the backlight assembly, and the backlight assembly is for providing light source to the display panel for the display panel to display images.

Figure 1A:
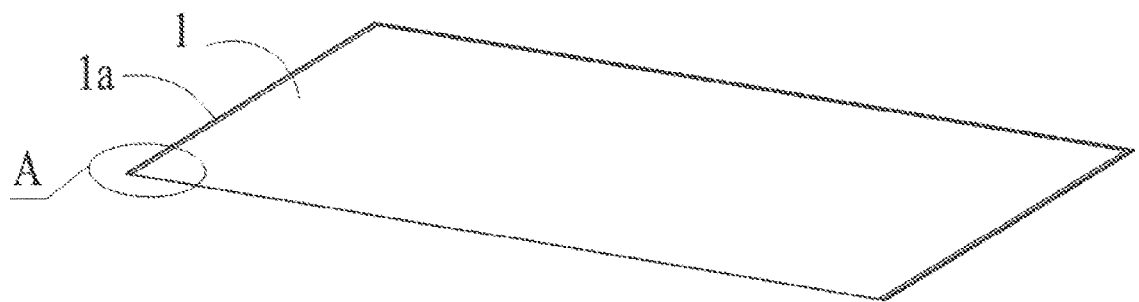
FIG. 1a is a schematic view of performing the first-time dispensing on the backplate according to an embodiment of the present invention.
Figure 1B:
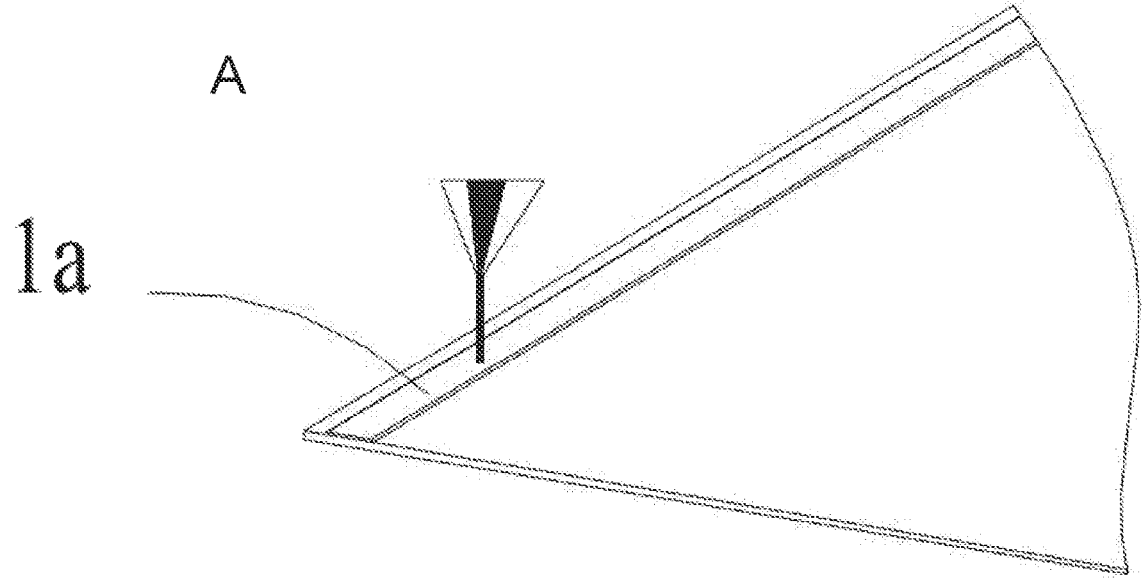

Specifically, the manufacturing method of display module comprises the following steps:

Step S10: as shown in FIG. 1a and FIG. 1b, providing a backplate 1, performing a first-time dispensing on bottom of the backplate 1.

Wherein, the position of the first-time dispensing corresponds to a colorless transparent portion of a two-color molding middle frame 3 described later, and the position 1a is an adhesive glue formed after the first-time dispensing. The applied glue is a photo-sensitive glue, also known as a ultraviolet (UV) curable adhesive (or UV adhesive) or an invisible adhesive, which can be cured under a certain range of UV light to form a glue layer.

Figure 2A:
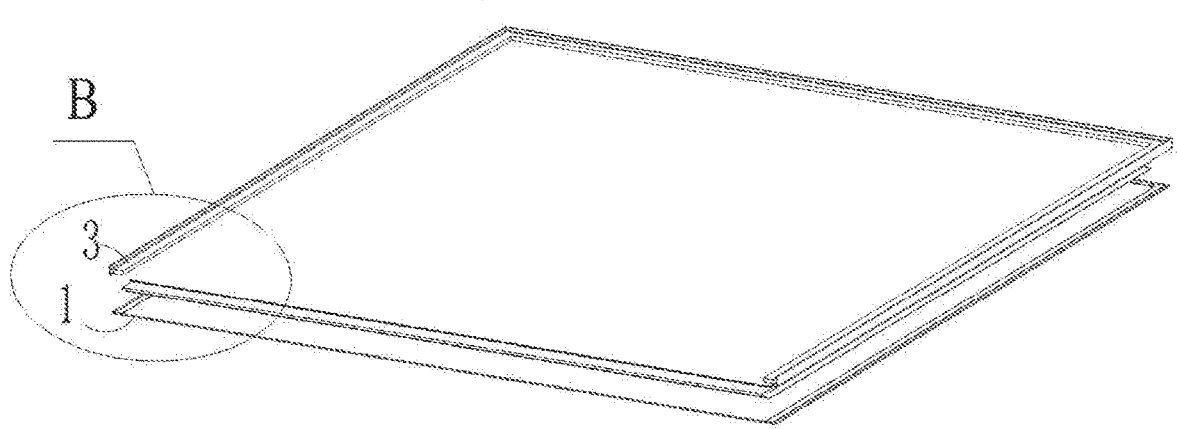
FIG. 2a is a schematic view of placing the middle frame and the backlight assembly on the backplate according to an embodiment of the present invention.
Figure 2B:
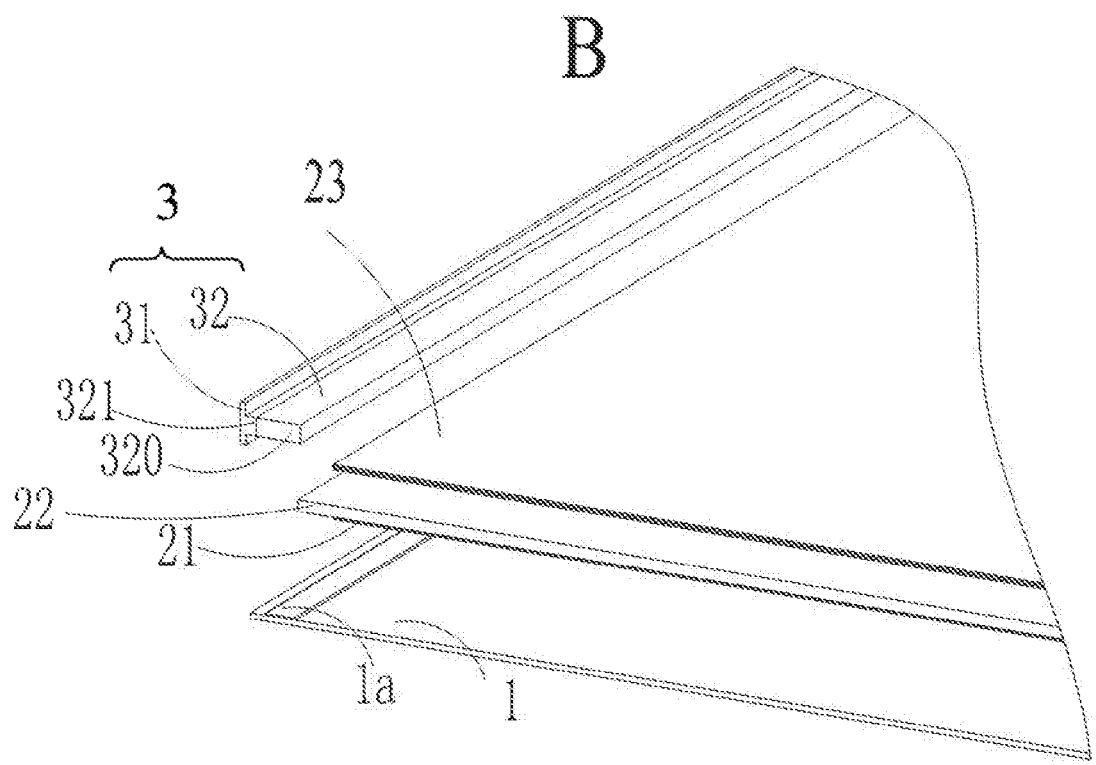
Figure 2C:
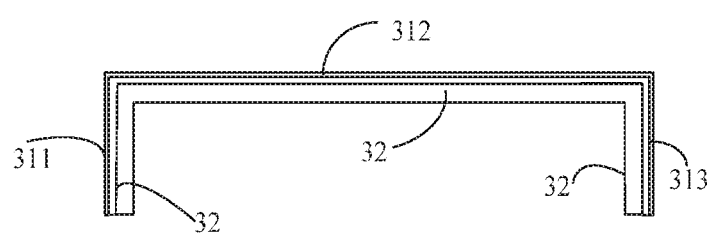
FIG. 2c is a top view of the middle frame 3 in FIG. 2b.

Step S20: providing a two-color molding middle frame 3, as shown in FIG. 2a and FIG. 2c, the middle frame 3 comprising three sidewalls 31 connected in sequence to form an accommodating space, as shown in FIG. 2b, a bottom portion or a middle portion of each sidewall 31 vertically extending into the accommodating space to form a protruding portion 32; the sidewalls 31 being colored, and the protruding portion comprising a colorless transparent portion (marked as 320 in FIG. 2b). The colorless transparent portion faces the light-exiting end surface of the light-guiding plate 22 described later.

Optionally, the three protruding portions 32 extending from the three sidewalls 31 of the middle frame 3 are on the same plane, which facilitates subsequent placement of a display panel 4 on the upper surface of the middle frame 3.

The above "colorless transparent portion of the protruding portion 32" can be understood as the protruding portion 32 is entirely colorless and transparent, or as shown in FIG. 2b, the protruding portion 32 comprises a colored portion 321 and a colorless transparent portion 322, connected in sequence. Wherein, the colored portion 321 is connected to the sidewall 31, and the colorless transparent portion 320 is away from the perpendicular sidewall 31. In the present embodiment, the longitudinal cross-section of the middle frame 3 is in a shape of "🯄".

In other embodiments, the longitudinal cross-section of the middle frame 3 can be in a shape of L. At this point, the protruding portion 32 extends from the bottom portion of each sidewall 31 vertically into the accommodating space.

Specifically, as shown in FIG. 2c, the middle frame 3 comprises a first sidewall 311, a second sidewall 312 and a third sidewall 313 sequentially connected, wherein the second sidewall 312 is located between the first sidewall 311 and the third sidewall 313, and the second sidewall 312 is perpendicular to both the first sidewall 311 and the third sidewall 313; the three sidewalls form an accommodating space in the shape of Π. Each sidewall 31 extends a protruding portion 32 vertically into the accommodating space. As such, the three protruding portions 32 also form a shape of Π. The positions 1a of the above first-time dispensing also form a shape of Π.

Wherein, the middle frame 3 is monolithically made of a plastic material.

Figure 3:
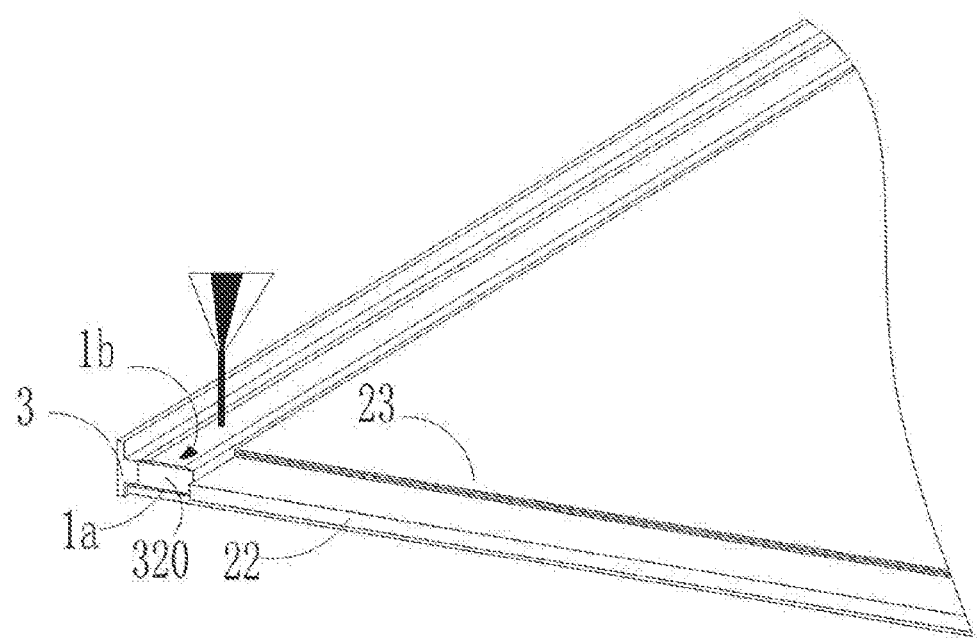
FIG. 3 is schematic view of performing the second-time dispensing on the backplate based on FIG. 2b.

Step S30: placing the middle frame 3 and a backlight assembly on the backplate so that the colorless transparent portion 320 of the protruding portion 32 being placed on the first-time dispensing glue 1a, and the colorless transparent portion 320 facing the backlight assembly, and the backlight assembly being in the accommodating space of the middle frame 3 (i.e., the middle frame 3 surrounds the backlight assembly); the backlight assembly comprising a reflective sheet 21, a light-guiding plate 22, and an optical film 23, all sequentially stacked on the backplate, as shown in FIGS. 2a, 2b, 3.

Specifically, the middle frame 3 is disposed outside the backlight assembly and surrounds three sides of the backlight assembly; longitudinal cross-sections of the middle frame 3 is in a shape of "🯄". Optionally, the protruding portion 32 of the middle frame 3 can contact the backplate 1 partially or entirely, and the sidewalls 31 of the middle frame 3 are located outside of the backplate 1 without contacting the backplate. Clearly, in other embodiments, when the protruding portions 32 of middle frame 3 extends from the bottoms of the sidewalls 31 inwards, the sidewalls 31 can partially extend beyond the backplate 1 if the middle frame 3 is placed on the backplate 1, or the bottoms of the sidewalls 31 are entirely in contact with the backplate 1.

Wherein, the disposition and fixation of the reflective sheet 21, light-guiding plate 22 and the optical film 23 are known technique and will not be described in details here.

The middle frame 3 and the reflective sheet 21, light-guiding plate 22 and the optical film 23 contact at the end surface (i.e., a side of the colorless transparent portion 320) of the protruding portion 32 away from the sidewall 31. As such, after assembly, the display module is prevented from light leakage.

The optical film 23 can be a prism sheet, a diffusion sheet, a filter film or other optical films, there is no specific limitation thereto. In the present embodiment, the optical film 23 comprises a first diffusion sheet, a prism sheet, and a second diffusion sheet, all sequentially stacked on the light-guiding plate 22.

Figure 4A:
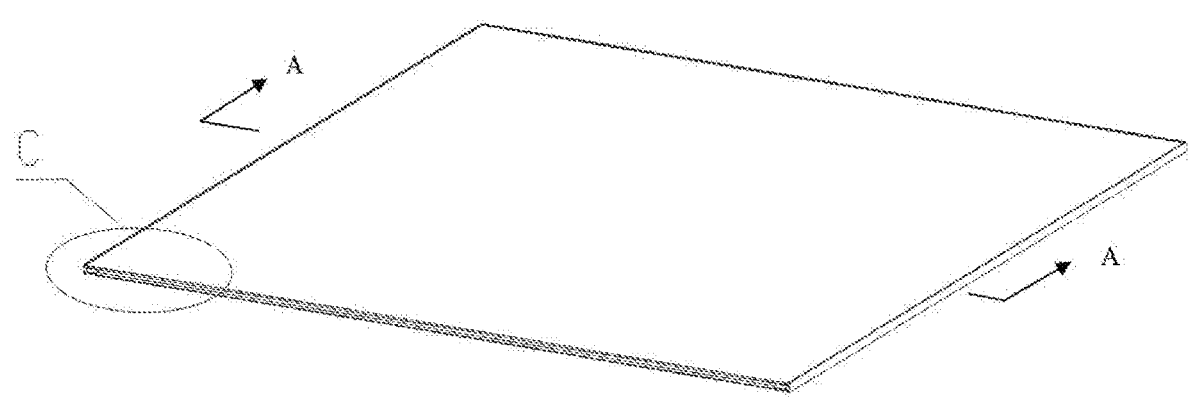
FIG. 4a is a schematic view showing placing display panel after second-time dispensing.
Figure 4B:
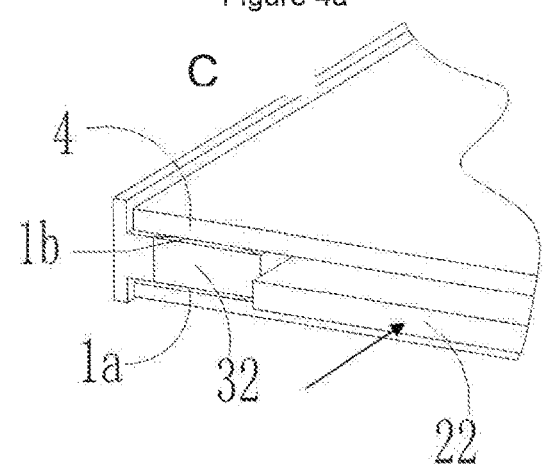

Step S40: as shown in FIG. 3, performing a second-time dispensing on upper surface of the colorless transparent portion 320 of the protruding portion 32; as shown in FIG. 4a and FIG. 4b, placing a display panel 4 on the backlight assembly with the display panel 4 located on the second-time dispensing 1b.

The position of the second-time dispensing 1b is between the upper surface of the colorless transparent portion 320 of the protruding portion 32 and the display panel 4. The display panel 4 is also above the protruding portion 32 of the middle frame 3. The position 1a formed by the above first-time dispensing is located between the lower surface of the colorless transparent portion 320 of the middle frame 3 and the backplate 1. Here, the position 1b of the second-time dispensing may also take the form of a "Π". Optionally, the display panel 4 entirely or partially covers the protruding portion 32 of the middle frame 3, but preferably cover the entire colorless transparent portion 320. In step S40, when the display panel 4 and the backlight assembly are stacked together, a fixture may be used to fix the above two together (not shown in the figure).

Step S50: using an ultraviolet (UV) curing light to irradiate incident surface of the light-guiding plate 22, with the ultraviolet light transmitted to the first-time dispensing 1a and the second-time dispensing 1b to cure glue at dispensing positions.

Figure 5A:
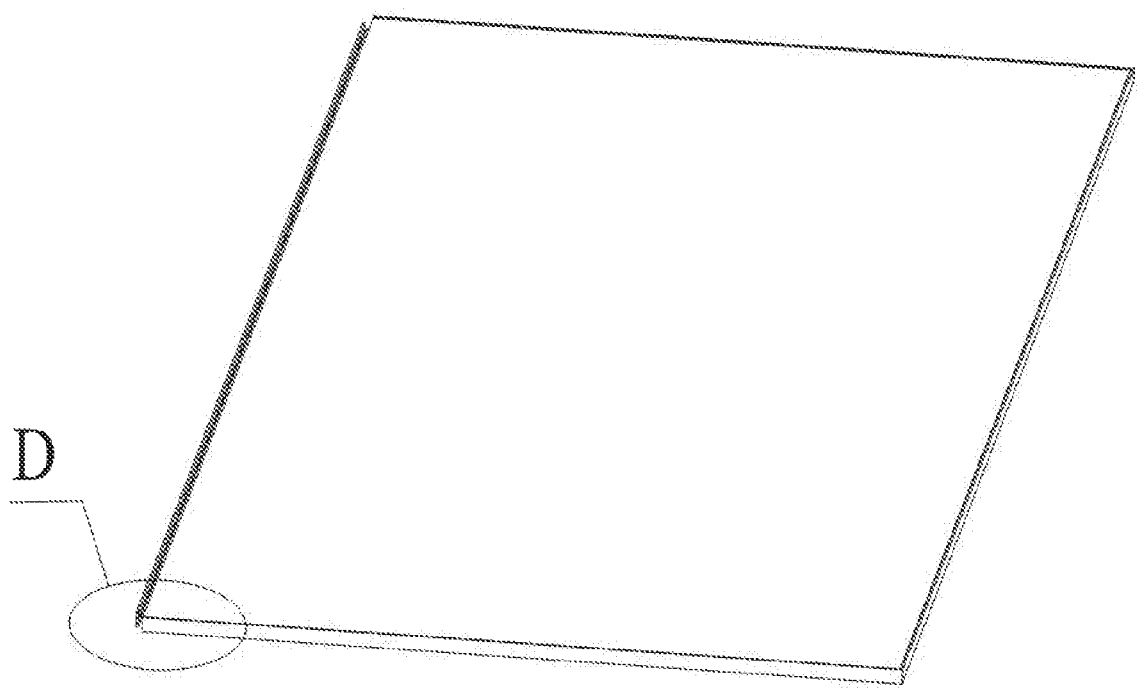
FIG. 5a is a schematic view of performing UV curing irradiation on the light-guiding plate.
Figure 5B:
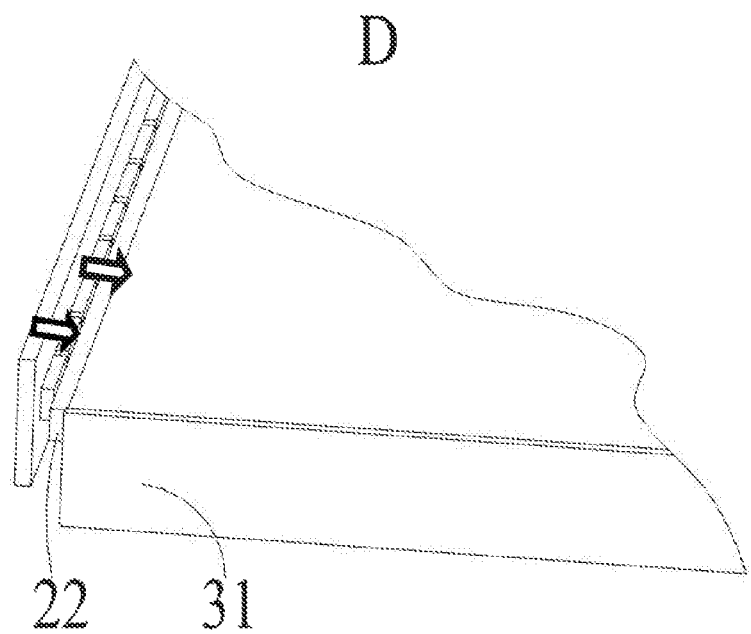

Here, the "incident surface of the light-guiding plate 22" may mean the ultraviolet irradiation is performed at the arrow in FIG. 4b. Optionally, as shown in FIG. 5a and FIG. 5b, a light board with a UV light source is placed on one end of the light-guiding plate 22. The UV light emitted from the UV light source can be incident perpendicularly to the end face of the light-guiding plate 22. The wide arrow in FIG. 5b represents the direction of illumination of the UV light source. After curing glue, the UV curing light source can be removed.

FIG. 5a shows placing the UV curing light source is disposed on one end surface of the light-guiding plate 22 and uses the light-guiding plate 22 to achieve single-side light-guiding. Optionally, to shorten the curing time of the photo-sensitive adhesive and strengthen the intensity of the UV light, the UV curing light source can be placed on both sides of the light-guiding plate 22, or three sides.

Figure 4C:
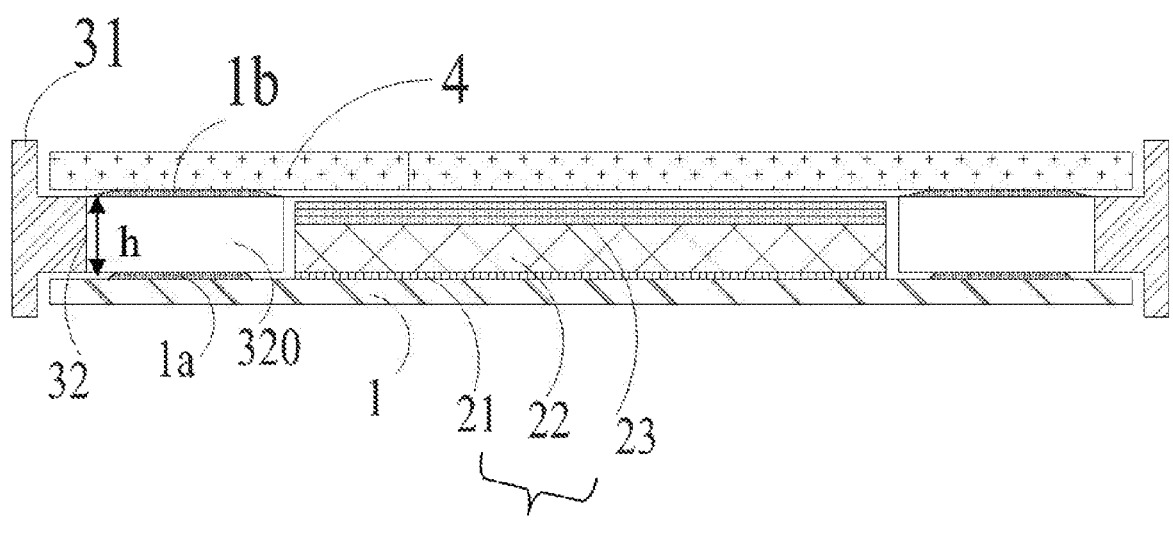

FIG. 4c is a cross-sectional view of the display module after the display panel is placed in the direction of the arrow in FIG. 4b, which can also be understood as a cross-sectional view in the direction of A-A in FIG. 4a. The backlight module formed by the backplate 1 and the backlight assembly in this embodiment is an edge-lit backlight module, so when the UV light is used to irradiate the side end surface of the light-guiding plate 22 (which can be understood as the horizontal direction in FIG. 4c), the UV light has total reflection occur in the light-guiding plate 22, and is finally emitted from the light-guiding plate 22 and conducted to the first-time dispensing position 1a and the second-time dispensing position 1b to cure the glue at the two dispensing positions to form a photo-sensitive glue layer.

As shown in FIG. 4c, optionally, the sum of the height h of the protrusion portion 32 and thickness of glue layer of the first-time dispensing 1a is greater than or equal to total height of the backlight assembly 20 (In FIG. 4c, the sum of the heights of the reflective sheet 21, the light-guiding plate 22, and the optical film 23 is shown.)

In other embodiments, if the backlight module is a direct type backlight module, an UV curing light source can be irradiated from below the light-guiding plate 22, that is, the position between the light-guiding plate 22 and the bac plate 1 in the vertical direction in FIG. 4c.

In the above manufacturing method of display module, a two-color molding middle frame 3 of a specific structure is used for first-time dispensing the colorless transparent portion of the protruding portion corresponding to the backplate 1, and second-time dispensing on the upper surface of the display panel 4 corresponding to the colorless transparent portion, irradiating the end surface of the light-guiding plate 22 with UV light can transmit the UV light to the above two dispensing positions and cure the glue into a photosensitive glue layer. Compared with the prior art using structural adhesive to bond the display panel and the backlight module, the present method can greatly shorten the glue curing time to greatly improves assembly efficiency. Moreover, when the display module needs to be reworked, the light able to disintegrate the photo-sensitive glue layer can be radiated on the light-guiding plate 22, so that the components of the display module can be easily and effectively separated for maintenance.

Figure 6:
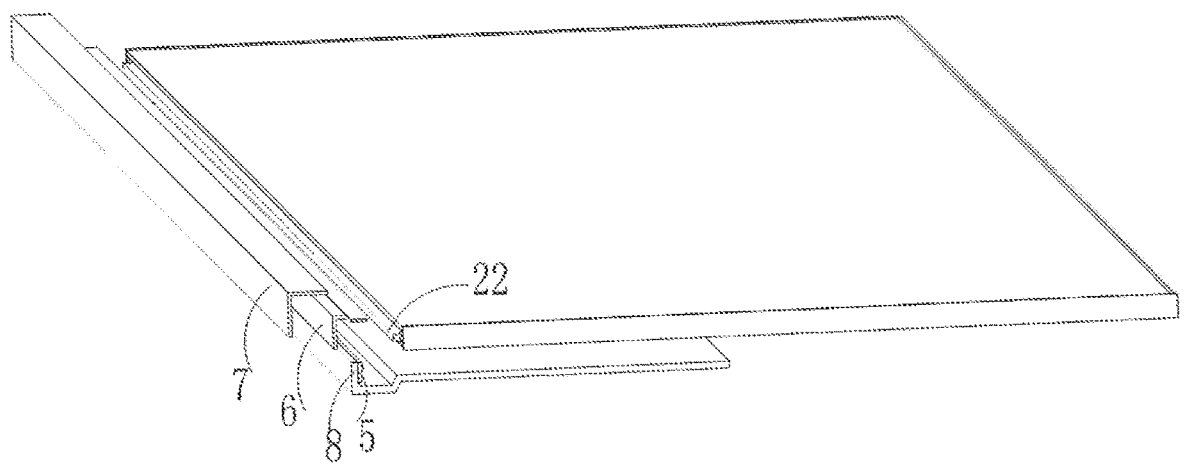
FIG. 6 is a schematic view showing placing light bar, batten and front frame after removing UV curing light.
Figure 7A:
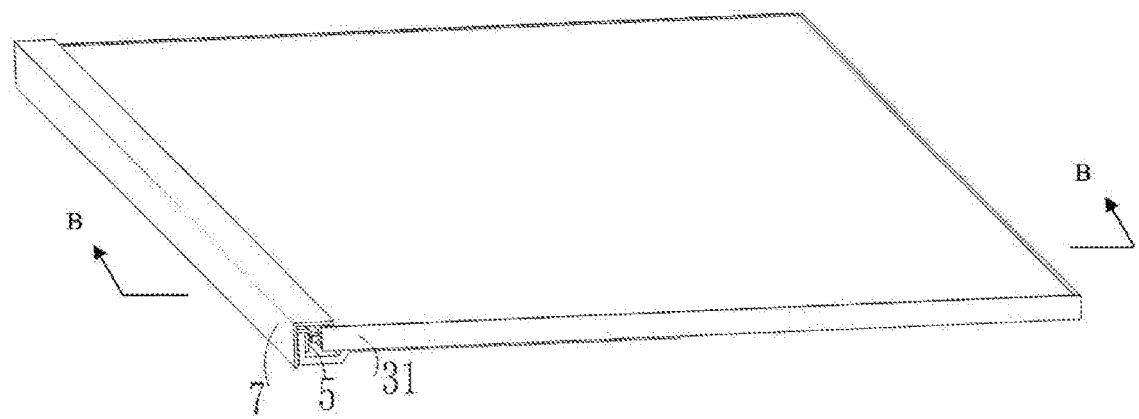
FIG. 7a is a schematic view showing the structure of the display module.
Figure 7B:
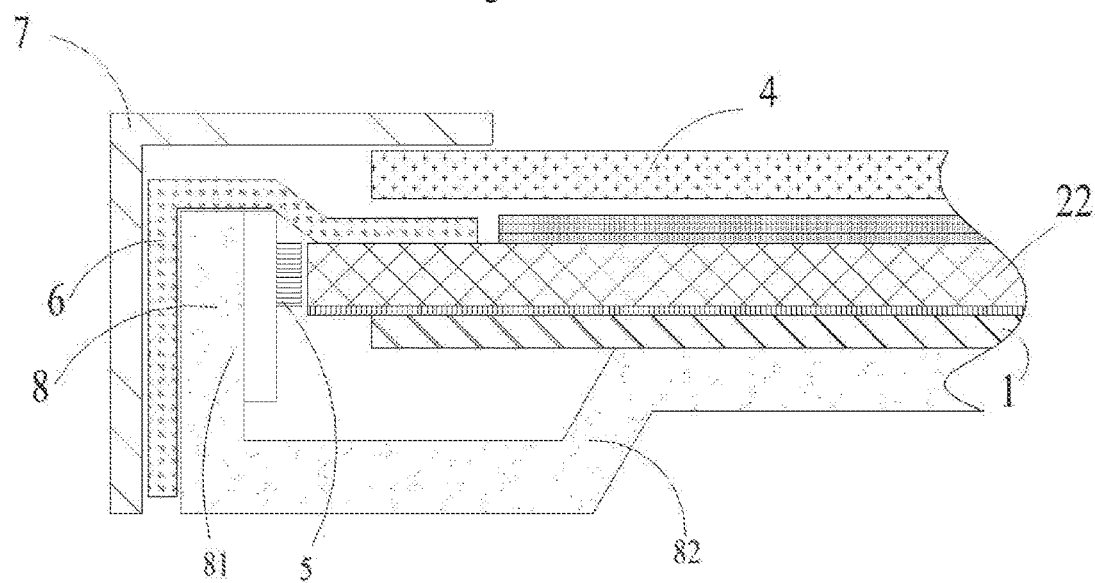
Figure 8:
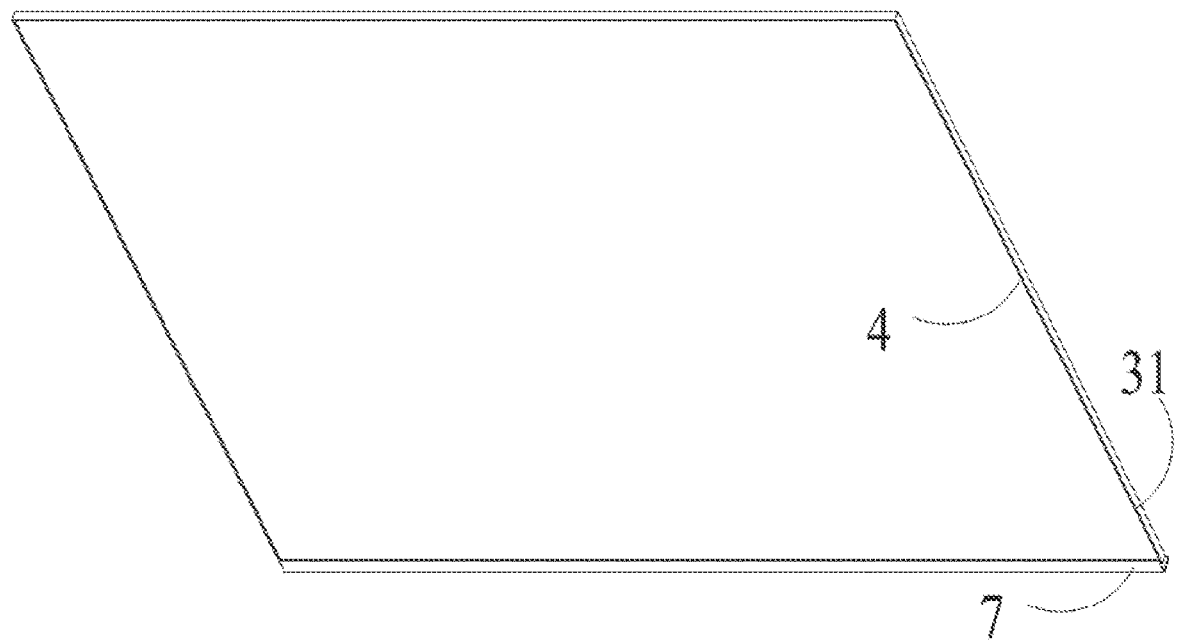
FIG. 8 is another schematic view showing the structure of the display module.
Figure 9:
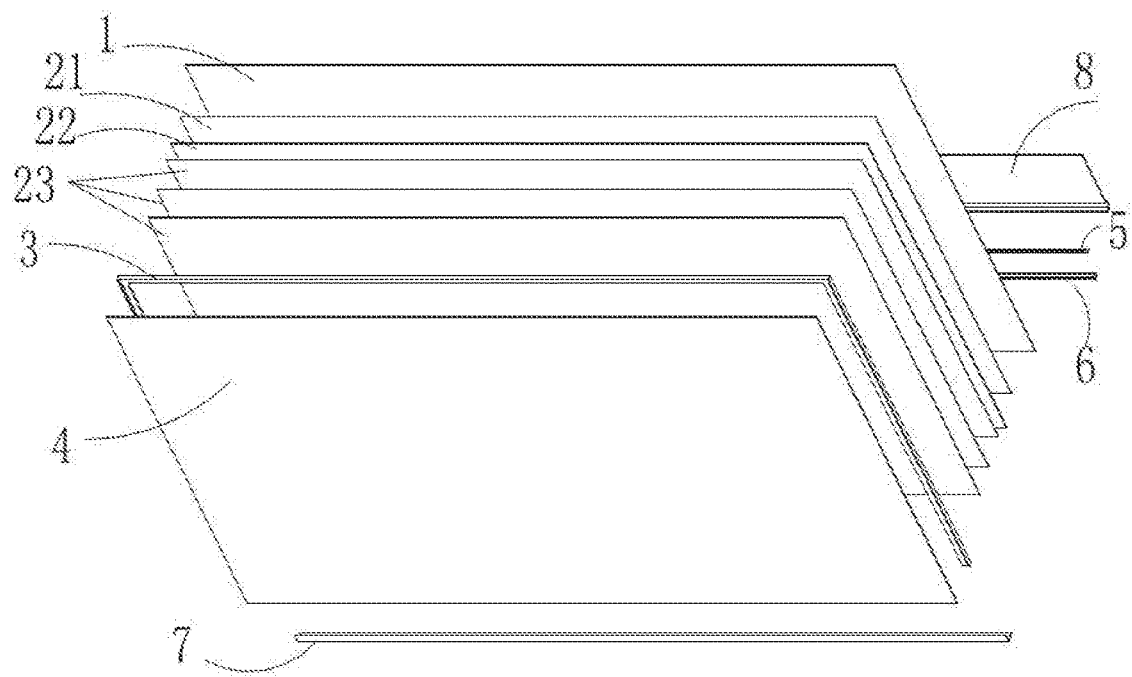
FIG. 9 is a dissected view showing the display module in FIG. 8.

Optionally, after step S50, the method further comprises:

Step S60: removing the UV curing light; referring to FIGS. 6, 7a, 7b, placing a light bar 5 on the incident surface of the light-guiding plate 22; then, placing a batten 6, with the batten 6 between the display panel 4 and the light-guiding plate 22, and located outside the light bar 5; and then, placing a front frame 7 outside the batten 6, with the display panel 4 partially protruding into the front frame 7 to complete preparation of the display module.

Wherein, the light bar 5 with a lighting source is fixed on a heat sink 8, and the heat sink 8 comprises a sidewall 81 and a bottom 82. The backplate 1 is carried on the bottom 82 of the heat sink 8. The aforementioned light bar 5 is fixed on the sidewall 81 of the heat sink 5. The light bar 5 may be an LED light bar. One end of the batten 6 is between the display panel 4 and the light-guiding plate 22, and the other end is located outside the sidewall 81 of the heat sink 8. The front frame 7 is located outside the batten 6, and the display panel 4 partially protrudes into the front frame 7. Optionally, the heat sink 8, the front frame 7, and the bead 6 may all be made of metal.

The following describes a display module manufactured by the above manufacturing method. As shown in FIG. 4c, the display module comprises: a backlight module, and a display panel 4 disposed on the backlight module; the backlight module comprising a backplate 1 and a backlight assembly 20 disposed on the backplate 1, the backlight assembly 20 comprising a reflective sheet 21, a light-guiding plate 22, and an optical film 23, all sequentially stacked on the backplate. The backplate 1 supports the backlight assembly 20.

The backlight module further comprises a two-color molding middle frame 3 (refer to FIG. 2b), the middle frame 3 comprises three sidewalls 31 connected in sequence to form an accommodating space, a bottom portion or a middle portion of each sidewall 31 vertically extends into the accommodating space and has a protruding portion 32; the sidewalls 31 are colored, and the protruding portion 32 comprising a colorless transparent portion. The protruding portion 32 of the middle frame 3 and the backlight assembly 20 are on the backplate 1, the backlight assembly 20 is in the accommodating space of the middle frame 3, and the display panel 4 is on the protruding portions 32.

Wherein a first photo-sensitive glue layer 1a is disposed between the backplate 1 and the colorless transparent portion of the protruding portion 32 of the middle frame 3 to achieve the effect of fixing the backplate 1 and the middle frame 3. A second photo-sensitive glue layer 1b is disposed between the display panel 4 and the colorless transparent portion of the protruding portion 32 to achieve the effect of fixing the middle frame 3 and the display panel 4.

In the display module, the photo-sensitive glue layer is only disposed on the upper and lower surfaces of the colorless transparent portion of the middle frame 3. Therefore, the glue layer takes short time to cure. When the display module requires reworking, the light able to disintegrate and strip off the photo-sensitive glue layer can be used without destroying the display panel 4 and the backlight assembly, so that the components of the display module can be easily and effectively separated for maintenance.

As shown in FIGS. 7a, 7b, 8, 9, the backlight module further comprises the light bar 5 with a lighting source, the batten 6, and the front frame 7. The backlight module is mainly used to provide a light source to the display panel 4 so that the display panel 4 displays an image. The light-guiding plate 22 is used to convert the linear light emitted by the lighting light source (not the UV curing light source mentioned in the above curing, which is removed after curing the glue) on the light bar 5 into the planar light with high luminous efficiency. The optical film 24 herein may specifically comprises a diffusion sheet, a prism sheet, and a diffusion sheet, all stacked together, but is not limited thereto. Wherein, the diffusion sheets can further diffuse the planar light formed by the light-guiding plate 22 evenly, and then the planar light enters the prism sheet. After passing through the prism sheet, the planar light finally forms a backlight with a specific irradiation angle. The reflective sheet 21 is used to reflect light partially emitted from the light-guiding plate 22 back to the light-guiding plate 22 to increase the utilization of light.

The backlight module here is an edge-lit type backlight module. At this time, the light bar 5 is arranged at the side of the light-guiding plate 22 (i.e., in the horizontal direction in FIG. 4c), and may also be disposed at two opposite sides of the light-guiding plate 22 to achieve double-side light-guiding by the light guide plate 22 so that the light intensity can be enhanced, and clearly, three-sided or four-sided arrangement can also be used. In other embodiments of the present invention, when the backlight module is a direct type backlight module, the light bar 5 may be arranged below the light-guiding plate 22 (i.e., the vertical direction in FIG. 4c, for example, between the light-guiding plate 22 and the backplate 1 or on the backplate 1).

The light bar 5 may be fixed on the sidewall 81 of the heat sink 8 by screws or rivets, and the bottom of the backplate 1 may be fixed on the bottom 82 of the heat sink 8; and the batten 6 is fixed (for example, latch or threaded connection) outside the sidewall 81 of the heat sink 8. Another batten 6 can be placed above the heat sink 8 and extends into between the display panel 4 and the light-guiding plate 22. The front frame 7 is fixed (threaded connection, latch) outside the batten 6 and makes the display panel 4 partially extended into the front frame 7 to hold the display panel 4.

In the above figures, the bac plate 1 is a flat plate structure. In other embodiments of the present invention, other structures, such as a structure having a bottom plate and two side plates connected thereto, can also be used. In this case, the heat sink 8 can be omitted, and the light bar 5 is fixed on the side plate of the backplate (edge-lit type backlight module) or on the bottom plate of the backplate (direct-lit type backlight module).

Moreover, an embodiment of the present invention further provides a display device, which comprises the display module as described in any one of FIGS. 1a-9. Clearly, it should also comprise other known structures such as a power supply unit and a drive control unit, and the details will be omitted here.

The display device in this embodiment may be a liquid crystal display device or an OLED display device. In addition, the display device may also be any display device, such as, an electronic paper, a mobile phone, a tablet computer, a television, a monitor, a notebook computer, a digital photo frame, or a navigation device., or any other products or parts able to display.

The display device of the present embodiment comprises the display module described above. Therefore, the display device can be conveniently assembled so that the border of the display device is extremely narrow or even borderless, which improves the appearance of the display device.

It should be noted that each of the embodiments in this specification is described in a progressive manner, each of which is primarily described in connection with other embodiments with emphasis on the difference parts, and the same or similar parts may be seen from each other. For the device embodiment, since it is substantially similar to the method embodiment, the description is relatively simple and the relevant description may be described in part of the method embodiment.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A manufacturing method of display module, comprising:

providing a backplate, performing a first-time dispensing on bottom of the backplate;

providing a two-color molding middle frame, the middle frame comprising three sidewalls connected in sequence to form an accommodating space, a bottom portion or a middle portion of each sidewall vertically extending into the accommodating space to form a protruding portion; the sidewalls being colored, and the protruding portion comprising a colorless transparent portion;

placing the middle frame and a backlight assembly on the backplate so that the colorless transparent portion of the protruding portion being placed on the first-time dispensing glue, and the colorless transparent portion facing the backlight assembly, and the backlight assembly being in the accommodating space; the backlight assembly comprising a reflective sheet, a light-guiding plate, and an optical film, all sequentially stacked on the backplate;

performing a second-time dispensing on upper surface of the colorless transparent portion of the protruding portion; placing a display panel on the backlight assembly with the display panel located on the second-time dispensing;

using an ultraviolet (UV) curing light to irradiate incident surface of the light-guiding plate, with the ultraviolet light transmitted to the first-time dispensing and the second-time dispensing to cure glue at dispensing positions;

wherein after curing the glue, the method further comprises:

removing the UV curing light, placing a light bar on the incident surface of the light-guiding plate;

placing a batten between the display panel and the light-guiding plate to be located outside the light bar;

placing a front frame outside the batten, with the display panel partially protruding into the front frame to complete preparation of the display module.

2. The manufacturing method of display module as claimed in claim 1, wherein the protruding portion comprises a colored portion and a colorless transparent portion, the colored portion is connected to the sidewall; or the protruding portion is entirely colorless and transparent.

3. The manufacturing method of display module as claimed in claim 1, wherein the three protruding portions extending from the three sidewalls of the middle frame are on the same plane.

4. The manufacturing method of display module as claimed in claim 3, wherein the middle frame comprises a first sidewall, a second sidewall and a third sidewall sequentially connected, wherein the second sidewall is located between the first sidewall and the third sidewall, and the second sidewall is perpendicular to both the first sidewall and the third sidewall; the accommodating of the middle frame is in the shape of Π.

5. The manufacturing method of display module as claimed in claim 1, wherein the middle frame is monolithically made of a plastic material.

6. The manufacturing method of display module as claimed in claim 4, wherein sum of the height of the protrusion portion and thickness of glue layer of the first-time dispensing is greater than or equal to total height of the backlight assembly.

7. The manufacturing method of display module as claimed in claim 4, wherein bottoms of the three protruding portions of the middle frame are entirely or partially in contact with the backplate, and the three sidewalls of the middle frame are located outside the backplate.

8. The manufacturing method of display module as claimed in claim 4, wherein bottoms of the three sidewalls of the middle frame are entirely or partially in contact with the backplate.

* * * * *